July 7, 1925.
A. LANCTOT
1,544,913
CIGAR AND CIGARETTE LIGHTER FOR MOTOR VEHICLES
Filed Feb. 27, 1923
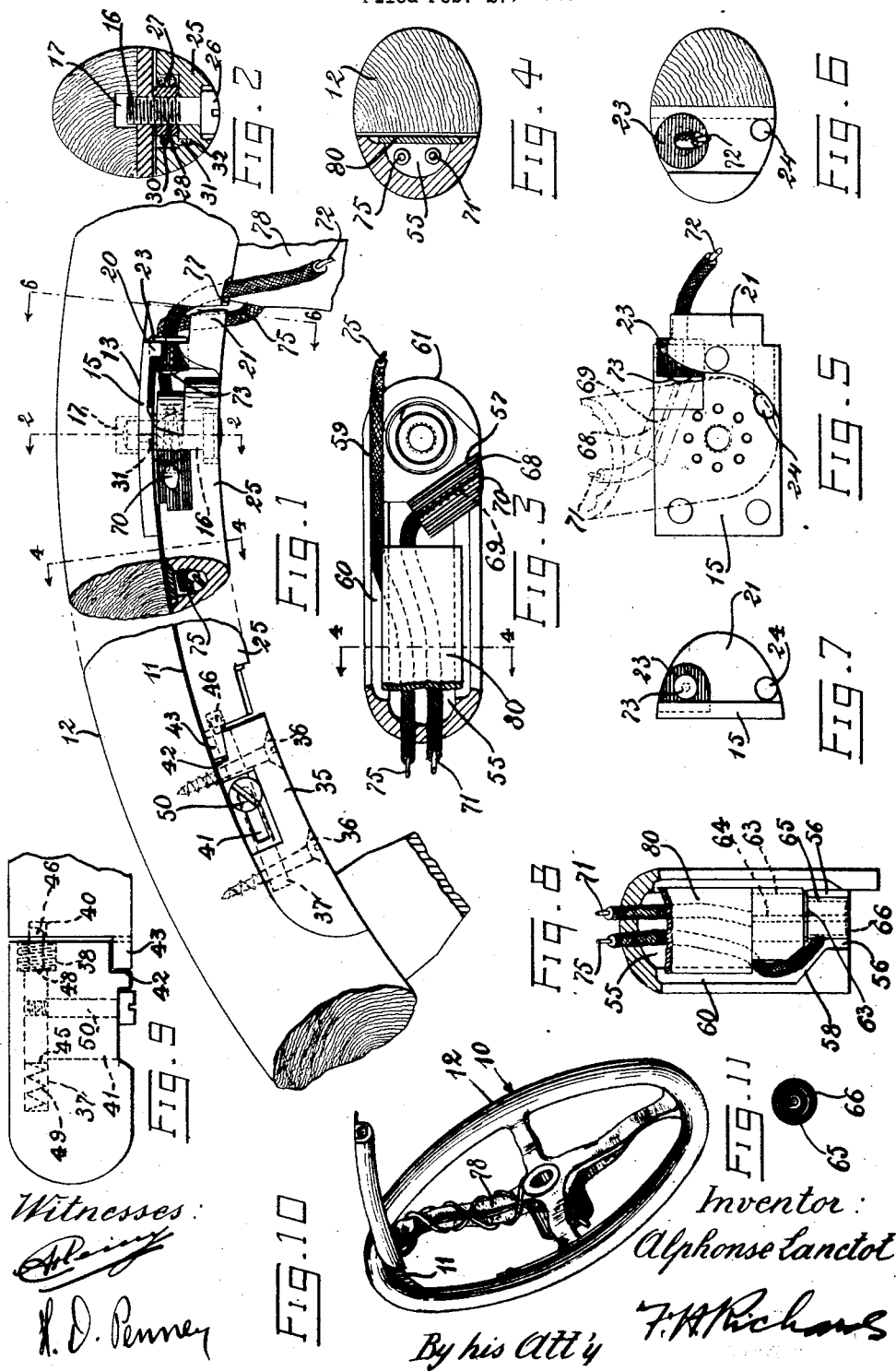
Witnesses:
Inventor:
Alphonse Lanctot
By his Att'y Patented July 7, 1925.

1,544,913

UNITED STATES PATENT OFFICE.

ALPHONSE LANCTOT, OF WESTCHESTER, NEW YORK.

CIGAR AND CIGARETTE LIGHTER FOR MOTOR VEHICLES.

Application filed February 27, 1923. Serial No. 621,534.

*To all whom it may concern:*

Be it known that I, ALPHONSE LANCTOT, a citizen of the United States, residing in Westchester, in the county of Westchester and State of New York, have invented certain new and useful Improvements in Cigar and Cigarette Lighters for Motor Vehicles, of which the following is a specification.

This invention relates to cigar lighters for the use of drivers of automobiles, though it is noted that the invention is not limited to automobile cigar lighters nor in some respects even to lighting devices.

One object of the invention is to provide an apparatus or device of this kind easily movable to convenient use by a person having his hands and attention otherwise occupied.

My present invention relates particularly to an improvement in cigar or cigarette lighters of the electrical resistance type, and has for its main object the provision of a lighter of the class described for automobile vehicles, whereby the driver thereof may conveniently use the same.

One of the important advantages or objects of my device is to provide such means, in such a manner as will make it not only convenient to light a cigar or cigarette, but to so arrange the device that the driver of the vehicle may readily light a cigar without taking his hands from the steering wheel, or lose sight of the road for an instant.

Another advantage of my device is the provision of means whereby this electric lighter may form part of the steering wheel mechanism of the vehicle, and whereby its characteristic structure may be merged into and become part of the said steering wheel without interference in any manner with the usefulness of the wheel as such.

Another advantage of my device is to provide means whereby when the device is in non-operative position, it may be readily brought to convenient cigar lighting position, and at the same time through the erectile action thereof causes switches to come into contact, thereby closing the lighting circuit so that the lighter itself may be caused to become operative.

Another advantage of my device is the provision of means whereby without moving the hand from the steering wheel the device may be caused to function.

While the device is here shown as a cigar lighter applied to the rim of the automobile wheel, it is noted that the device could also be applied to a spoke or other convenient object, and could be used for carrying ash receptacles or flasks in addition to or instead of cigar lighters.

Other objects and advantages of the invention are to improve generally the simplicity and efficiency of such devices and to provide a device or apparatus of this kind which is durable, economical to manufacture and operate and which will not get out of order.

The inventive features for the accomplishment of these and other objects are shown in connection with my improved cigar lighter which, briefly stated, comprises a lighter carrying member pivotally mounted on a steering wheel having a cut-out recess in which is mounted a pivot block on which is fulcrumed the lighter carrying member. A spring throws the member to lighting position on the release of a bolt carried in a bolt block for locking the member in closed position. The lighter or igniting element is mounted at the outer end of the carrying member; and conductors connect said element to a suitable battery or other source of current.

Other objects of the invention will appear as the description proceeds; and while herein details of the invention are described, the invention is not limited to these, since many and various changes may be made without departing from the scope of the invention as claimed.

In the accompanying drawing, showing by way of example, one of many possible embodiments of the invention, Fig. 1 is a fragmental plan of a portion of the rim of the steering wheel;

Fig. 2 is a transverse vertical sectional view, partly in elevation, taken on the line 2—2 of Fig. 1, looking in the direction of the arrow of said line;

Fig. 3 is a fragmental bottom plan of the inner end of the pivoted carrying member;

Fig. 4 is a transverse vertical sectional view, taken on the line 4—4 of Figs. 1 and 3, looking in the direction of the arrows of said lines;

Fig. 5 is a fragmental bottom plan of the pivot block;

Fig. 6 is a transverse vertical sectional view, partly in elevation, taken on the line 6—6 of Fig. 1, looking in the direction of the arrow of said line;

Fig. 7 is an end elevation of the pivot block;

Fig. 8 is a bottom plan of the outer end of the carrying member;

Fig. 9 is a plan of the bolt block removed;

Fig. 10 is a perspective view of the steering wheel with the cigar lighter applied; and Fig. 11 is an end elevation of the carrying member and lighter.

My improved cigar lighter is shown in combination with a steering wheel 10 provided with an arcuate cut-out recess 11 at the inner periphery of the rim 12. Said recess is provided with an extended sunken portion 13 (Fig. 1) receiving a fixed pivot block 15 provided at its mid part with a pivot receiving opening receiving a pivot bolt 16 (Fig. 2) therein having its inner end received in a hole 17 in the floor of said recess. Said block is provided near and spaced from the adjacent end wall of the end of the recess with an end wall 20 provided with an overhanging portion 21 and a pair of parallel bores, the upper receiving an upper bushing 23, the lower opening 24 being without a bushing.

A lighter and conductor carrying segment member 25 disposed flush in said cut-out recess is provided at its inner end with a bearing bore received on said bolt 16, said bore being countersunk at the outer end to receive the bolt head 26 and having a spring receiving enlargement 27 at the inner end receiving a spacing collar 28 disposed on said bolt and around which is disposed a spring 30 having angular opposite ends 31 received in small holes 32 in said block and segment respectively. The spring is tensioned to throw the segment approximately perpendicular to the plane of the wheel as shown in Fig. 10.

A bolt block 35 fixed by screws 36 in the end of said cut-out recess opposite from the block 15 is provided at the lower part with a longitudinal belt receiving bore 37 (Fig. 9) enlarged at the outer end 38 and alined with a latching recess 40 of the segment 25 when it is in closed position. The upper part of said bolt block is provided with a longitudinal slot 41 extending into said bore 37, and with a wedge shaped positioning recess 42 receiving a positioning wedge 43 of the segment. A bolt 45 in said bore 37 is provided with a shoulder forming reduced beveled active end 46 receivable in said latching recess 40. A bolt-retaining threaded bushing 48 received on said enlarged end 38 holds the bolt in place against the action of a spring 49 compressed between the inner end of the bolt and bore for yieldably holding the bolt in locking position. A manipulating pin 50 radially fixed to the bolt projects through said slot 41 for retracting the bolt.

The inner face of the segment member 25 is provided with a marginally recessed longitudinal channel 55 (Figs. 3 and 8) communicating with an insulator and lighter receiving cavity 56 at the outer end, an upwardly inclined terminal recess 57 at the inner end, and conductor receiving grooves 58 and 59 respectively extending from the upper margin 60 of the channel to said cavity 56 and the inner end face 61 of the segment.

An insulating bushing 63 (Fig. 8) in the inner end of said cavity 56 supports an axially disposed supporting conductor rod 64, and a conducting cylindrical shell 65 secured to the outer end of the bushing also coaxial therewith. A transversely disposed spiral igniting element 66 (Fig. 11) connecting said shell and rod at their outer ends is heated to incandescence by electric current passing therethrough and forms the lighter element for lighting the cigars.

An insulating bushing 68 in said terminal recess supports a contact terminal pin 69 passing therethrough and provided with an outer contact button or head 70. An insulated conductor 71 passing through said channel 55 connects the rod 64 with the terminal pin 69. An insulated conductor 72 is secured to the outer end of a fixed contact terminal 73 (Figs. 1 and 5) in said upper bushing 23 and having its contact head adapted to be engaged by said button 70 when the lighter is thrown up. An insulated conductor 75 (Figs. 1 and 8) secured to said shell 65 passes through said grooves 58 and 59, said channel 55, the inner end face 61 of said segment and said lower bore 24 (Fig. 6). Said conductors 72 and 75 pass through upper and lower conductor receiving recesses 77 of the end wall of the cut-out recess, and thence around one of the spokes 78 to a suitable source of current not shown. A cover plate 80 secured in the marginal recesses 60 of the channel covers the conductors 71 and 75 therein.

The operation of the device is simple and obvious. When the pin 50 (Fig. 9) is pressed back, the member 25 rises vertically from the rim of the wheel as shown in Fig. 10 and raises the igniting element 66. Contact of the button 70 with the contact 73 (Fig. 1) completes electric connection with the batteries (not shown) through conductor 72, contact 73, conductor 71, rod 64, element 66, shell 65, and conductor 75. The element 1 thus becomes incandescent and is held in position for the driver to lean over and light a pipe or cigar, etc. without taking his eyes off the road.

To close the member 25, it is merely necessary to push it down to the driving position shown in Fig. 1, whereupon at once it becomes a part of the rim 12.

I claim as my invention;

1. In a lighting device, a support, a lighter carrying member, pivotally mounted on said support and resting thereon in non-lighting position, a spring to throw the member to lighting position, a bolt to lock the member in closed position, an igniting element mounted at the outer end of the member, and conductors for connecting said element to a suitable source of current.

2. In a lighting device, a support having a cut out recess therein, a pivotal block fastened in said recess flush with the surface of said support, and provided at its end with a wall, upper and lower bushings in said wall, a pivotal bolt fastened in said block, a lighter carrying segment in said cut out recess and provided at its outer end with a latching recess and at the inner end with a bearing bore received on said bolt, a spring to throw the segment open, a bolt block fixed in the other end of said cut out recess, a bolt in said bolt block receivable in said latching recess, said segment being provided with a lighter receiving cavity at the outer end, and a terminal recess at the inner end, an insulating bushing in the inner end of said cavity, a supporting conductor rod passed axially through said bushing, a transversely disposed spiral igniting element connected to said rod at the outer end, an insulated contact terminal in said terminal recess, a conductor connecting said rod and terminal pin, a fixed contact terminal in said upper bushing adapted to be engaged by said insulated terminal when the lighter is thrown out, and conductors for connecting said fixed terminal and the heating element to a suitable source of current.

3. In a lighting device, a support having a recess, an arm pivotally connected to said support and normally disposed in said recess and the free end of said arm, a spring to move the arm to lighting position and means for lighting said lighter when disposed in lighting position.

4. In a lighting device, a support, a lighter arm mounted on said support, and means for mechanically actuating said lighter arm into lighting position, a releasable means for locking said lighter arm in non-lighting position.

5. In a lighting device, a support, a lighter arm pivotally connected to said support, means for mechanically actuating said lighter arm into lighting position, and releasable means for locking said lighter arm in non-lighting position.

6. In a lighting device, a support having a recess formed therein, a segment conforming to said recess and pivotally connected to said support, means for mechanically actuating said segment out of said recess into lighting position, and releasable means for locking said segment in said recess.

7. In a lighting device, a support, a lighter arm pivotally connected thereto, means for mechanically actuating said lighter arm into lighting position, an electrical heater at the end of said lighter arm, electrical conductors, contacts connected to said conductors and adapted to engage one another to establish a circuit when said lighter arm is disposed in lighting position, and means for locating said lighter arm in non-lighting position when said contacts are disengaged.

8. In a lighting device, a movable curved support, having a cut out recess at its inner periphery, a lighter carrying member pivotally mounted in said recess flush with said periphery, a spring to throw the member to lighting position, and an igniting element mounted at the outer end of said member.

9. In combination, a circular support provided with an arcuate cut-out recess at the inner periphery of the rim thereof; said recess being provided at one end wall with conductor receiving recesses, and with an extended sunken portion in the floor of the recess formed with a hole near the mid part; a pivot block fixed in said sunken portion flush with the floor and provided at its mid part with a pivot receiving opening alined with said hole, and near the adjacent end of the recess with an end wall near and spaced from the end wall of the end of the recess and provided with a pair of parallel bores, and an overhanging portion flush with the inner periphery of the circular support; an upper bushing in the upper of said parallel bores; a pivot bolt fast in said pivot receiving opening and having its inner end received in said hole; a lighter carrying segment member in said cut-out recess and provided at its outer end with a bearing bore received on said bolt; a spring to throw the segment open; a bolt to lock the member in closed position; an igniting element mounted at the outer end of the member; and conductors connecting said element to a suitable source of current and passing through said bushing bores and receiving recesses.

10. In combination, a circular support provided with a cut-out recess in the inner rim thereof; a pivot bolt fast in the floor of said recess; a lighter and conductor carrying segment member in said cut-out recess and provided at its outer end with a latching recess and a positioning wedge and at the inner end with a bearing bore received on said bolt; a bolt block fixed in the other end of said cut-out recess and provided at the lower part with a longitudinal bolt receiving bore enlarged at the outer end and alined with said latching recess when the segment is in closed position; the upper part of said bolt block being provided with a longitudinal slot extending into said bore, and a wedge shaped positioning recess receiving said positioning wedge of the segment; a bolt in said bolt receiving bore and provided with a shoulder forming reduced beveled active end receivable in said latching recess of the segment; a bolt-retaining threaded bushing received on said reduced end and in said bore; a spring compressed between the inner end of the bolt and bore for yieldably holding the bolt in locking position; and a manipulating pin radially fixed to the bolt and projecting through said slot for retracting the bolt.

11. In combination, a support having a cut-out recess; a lighter carrying segment member pivotally mounted on said support in said recess; the inner face of said segment being provided with a marginally recessed longitudinal channel communicating with a cavity at the outer end, terminal recess at the inner end, and grooves respectively extending from the upper margin of said channel to said cavity and the inner end face of the member; an insulating bushing in the inner end of said cavity; a conductor rod passing through said bushing; an igniting element on said rod; an insulated contact terminal in said terminal recess; a conducting means connecting said rod and terminal and passing through said channel; an insulated contact engageable by said terminal; a service conductor secured to said contact; a service conductor connected to said element and passing through said grooves and said channel; and a cover plate secured in said marginal recesses.

12. In combination, a support; a lighter carrying segment member pivotally mounted on said support and provided with a lighter receiving cavity at the outer end, and a terminal recess at the inner end; an insulating bushing in the inner end of said cavity; a supporting conductor rod passed axially through said bushing; a conducting cylindrical shell secured to the outer end of the bushing coaxial therewith; a transversely disposed spiral igniting element connecting said shell and rod at their outer ends; an insulating bushing in said terminal recess; a terminal passing therethrough; a conductor connecting said rod and terminal; and conductors for connecting said terminal and shell to a suitable source of current.

13. In combination, a support; a carrying member pivoted on said support; an insulated terminal on said member; a spring to throw the member to lighting position; an igniting element on the member; a conductor connecting one end of said element and terminal pin; an insulated contact adapted to be engaged by said terminal when the lighter is thrown up; and insulated conductors secured to the other end of said element and said contact for connecting with a source of current.

14. In combination, a support provided with a cut-out recess provided at one end wall with upper and lower conductor receiving recesses; a pivot block fixed in said recess floor and provided with an end wall provided with upper and lower parallel bores; an upper bushing in said upper bore; a bolt in said block; a lighter carrying segment member in said cut-out recess pivotally received at its inner end on said bolt and provided with an upwardly inclined terminal recess at the inner end; a terminal bushing in said terminal recess; a terminal in said terminal bushing; a spring to throw the segment member up to lighting position; a bolt to lock the member closed; an igniting element at the outer end of the member; a conductor connecting one end of said element and terminal pin; a fixed contact in said upper bushing and having a contact head adapted to be engaged by said terminal when said member is thrown up; an insulated conductor secured to the outer end of said contact; and an insulated conductor secured to the other end of said element and passing through said segment and said lower bore; said conductors being passed through said conductor receiving recesses to a suitable source of current.

15. In combination, a circular support provided with a cut-out recess in the inner rim face thereof; a pivot block fixed in said recess flush with the floor of the recess; a pivot bolt fast in said block; a lighter and conductor carrying segment disposed flush in said cut-out recess and provided at its inner end with a bearing bore received on said bolt and countersunk at the outer end to receive the bolt head and having a spring receiving enlargement at the inner end; a spacing collar on said bolt in said enlargement; a spring around said collar and having angular opposite ends received in small holes in said block and segment respectively, the spring being tensioned to throw the segment approximately perpendicular to the plane of the wheel; and an igniting means mounted at the outer end of the carrying member.

ALPHONSE LANCTOT.

Witnesses:
 H. M. KILPATRICK,
 H. D. PENNEY.